(12) United States Patent
Guan et al.

(10) Patent No.: US 12,081,982 B2
(45) Date of Patent: Sep. 3, 2024

(54) OPTIMIZATION FOR AN INITIAL ACCESS STRATUM SECURITY MODE COMMAND PROCEDURE

(71) Applicant: QUALCOMM Incorporated, San Diego, CA (US)

(72) Inventors: Xuepan Guan, San Diego, CA (US); Osama Lotfallah, San Diego, CA (US); Vitaly Drapkin, San Diego, CA (US); Cogol Tina, Mission Viejo, CA (US); Swathi Seshadri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/468,331

(22) Filed: Sep. 7, 2021

(65) Prior Publication Data

US 2022/0078617 A1     Mar. 10, 2022

Related U.S. Application Data

(60) Provisional application No. 63/075,671, filed on Sep. 8, 2020.

(51) Int. Cl.
*H04W 12/08* (2021.01)
*H04L 9/40* (2022.01)
*H04W 76/10* (2018.01)

(52) U.S. Cl.
CPC .......... *H04W 12/08* (2013.01); *H04L 63/105* (2013.01); *H04W 76/10* (2018.02)

(58) Field of Classification Search
CPC ..... H04W 76/10; H04W 12/08; H04W 76/18; H04W 76/50; H04L 63/20; H04L 63/105
See application file for complete search history.

(56) References Cited

U.S. PATENT DOCUMENTS

| 11,558,774 | B2 * | 1/2023 | Jangid | .................. | H04W 76/18 |
| 11,564,100 | B2 * | 1/2023 | Li | ...................... | H04W 12/0431 |
| 11,622,268 | B2 * | 4/2023 | Li | ......................... | H04W 88/06 726/3 |
| 2017/0318463 | A1 * | 11/2017 | Lee | ...................... | H04L 63/0869 |
| 2018/0324138 | A1 * | 11/2018 | Das | ................... | H04W 36/0055 |
| 2019/0182884 | A1 * | 6/2019 | Deenoo | .............. | H04W 68/005 |
| 2020/0359348 | A1 * | 11/2020 | Kumar | .................. | H04W 12/06 |
| 2021/0127272 | A1 * | 4/2021 | Zhao | .................... | H04W 76/25 |
| 2021/0274426 | A1 * | 9/2021 | Grayson | .............. | H04M 15/60 |
| 2021/0297400 | A1 * | 9/2021 | Lehtovirta | ............ | H04L 63/065 |

(Continued)

*Primary Examiner* — Khawar Iqbal
(74) *Attorney, Agent, or Firm* — Guang Yu Zhang; Patterson & Sheridan LLP

(57) ABSTRACT

Techniques and apparatus for optimizing an initial access stratum security mode command procedure are described. One example technique includes sending a first service request to establish a connection with a network. A second service request is sent to the network, upon determining that one or more criteria is satisfied. Another example technique includes sending a first service request to establish a connection with a network and sending a second service request after sending the first service request. The first service request is associated with a first security parameter and the second service request is associated with a second security parameter. A security mode command procedure is participated in with a base station, based on the first security parameter and the second security parameter.

24 Claims, 14 Drawing Sheets

(56) References Cited

U.S. PATENT DOCUMENTS

| | | | |
|---|---|---|---|
| 2022/0053325 A1* | 2/2022 | Hu | H04W 12/041 |
| 2022/0225100 A1* | 7/2022 | Muhanna | H04L 9/3242 |
| 2022/0279470 A1* | 9/2022 | Tangudu | H04W 8/183 |
| 2022/0295284 A1* | 9/2022 | Ben Henda | H04W 60/02 |
| 2022/0408346 A1* | 12/2022 | Grayson | H04W 12/082 |
| 2023/0080836 A1* | 3/2023 | Vahidi Mazinani | H04W 60/06 455/435.1 |
| 2023/0156650 A1* | 5/2023 | Salkintzis | H04W 12/08 455/435.1 |
| 2023/0254695 A1* | 8/2023 | Watfa | H04W 76/18 455/410 |

\* cited by examiner

| Service type value (octet 1) | | | | |
|---|---|---|---|---|
| Service type value | | | | |
| Bits | | | | Service Types 902 |
| 4 | 3 | 2 | 1 | |
| 0 | 0 | 0 | 0 | Signaling |
| 0 | 0 | 0 | 1 | Data |
| 0 | 0 | 1 | 0 | Mobile terminated services |
| 0 | 0 | 1 | 1 | Emergency services |
| 0 | 1 | 0 | 0 | Emergency services fallback |
| 0 | 1 | 0 | 1 | High priority access |
| 0 | 1 | 1 | 0 | Elevated signaling |
| 0 | 1 | 1 | 1 | Unused; shall be interpreted as "signaling", if received by the network |
| 1 | 0 | 0 | 0 | Unused; shall be interpreted as "signaling", if received by the network |
| 1 | 0 | 0 | 1 | Unused; shall be interpreted as "data", if received by the network |
| 1 | 0 | 1 | 0 | Unused; shall be interpreted as "data", if received by the network |
| 1 | 0 | 1 | 1 | Unused; shall be interpreted as "data", if received by the network |
| All other values are reserved | | | | |

FIG. 9

OPTIMIZATION FOR AN INITIAL ACCESS STRATUM SECURITY MODE COMMAND PROCEDURE

CROSS-REFERENCE TO RELATED APPLICATION

This application claims the benefit of and priority to U.S. Provisional Application No. 63/075,671, filed Sep. 8, 2020, which is assigned to the assignee hereof and hereby expressly incorporated by reference herein in its entirety.

BACKGROUND

I. Field of the Disclosure

Aspects of the present disclosure relate to wireless communications, and more particularly, to techniques for optimizing secure control plane communications between a user equipment (UE) and a base station (BS).

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the subject matter described in this disclosure can be implemented in a method for wireless communication performed by a user equipment (UE). The method generally includes sending a first service request to establish a connection with a network. The first service request is associated with a first security parameter. The method also includes, upon determining that one or more criteria is satisfied, sending a second service request to the network. The second service request is associated with a second security parameter.

Certain aspects of the subject matter described in this disclosure can be implemented in an apparatus for wireless communication. The apparatus generally includes a transmitter and a processing system. The transmitter is configured to transmit a first service request to establish a connection with a network. The first service request is associated with a first security parameter. The processing system includes a memory comprising computer-executable instructions and one or more processors configured to execute the computer-executable instructions and cause the processing system to determine whether one or more criteria is satisfied. The transmitter is further configured to transmit a second service request to the network when the processing system determines the one or more criteria is satisfied. The second service request is associated with a second security parameter.

Certain aspects of the subject matter described in this disclosure can be implemented in an apparatus for wireless communication. The apparatus generally includes means for sending a first service request to establish a connection with a network. The first service request is associated with a first security parameter. The apparatus also includes means for sending a second service request to the network, upon determining that one or more criteria is satisfied. The second service request is associated with a second security parameter.

Certain aspects can be implemented in a non-transitory computer-readable medium for wireless communication by a UE. The non-transitory computer-readable medium may comprise computer-executable instructions that, when executed by one or more processors of a processing system, cause the processing system to: send a first service request to establish a connection with a network, wherein the first service request is associated with a first security parameter; and upon determining that one or more criteria is satisfied, send a second service request to the network, wherein the second service request is associated with a second security parameter.

Certain aspects can be implemented in a computer program product for wireless communication by a UE embodied on a computer-readable storage medium. The computer-readable storage medium may include code for: sending a first service request to establish a connection with a network, wherein the first service request is associated with a first security parameter; and upon determining that one or more criteria is satisfied, sending a second service request to the network, wherein the second service request is associated with a second security parameter.

Certain aspects of the subject matter described in this disclosure can be implemented in a method for wireless communication by a UE. The method generally includes sending a first service request to establish a connection with a network. The first service request is associated with a first security parameter. The method also includes, after sending the first service request, sending a second service request to the network. The second service request is associated with a second security parameter. The method further includes participating in a security mode command procedure with a base station, based on the first security parameter and the second security parameter.

Certain aspects of the subject matter described in this disclosure can be implemented in an apparatus for wireless communication. The apparatus generally includes a transmitter and a processing system. The transmitter is configured to transmit a first service request to establish a connection with a network. The first service request is associated with a first security parameter. The transmitter is also configured to transmit a second service request to the network, after transmitting the first service request. The second service request is associated with a second security parameter. The processing system includes a memory comprising computer-executable instructions and one or more processors configured to execute the computer-executable instructions and cause the processing system to participate in a security mode command procedure with a base station, based on the first security parameter and the second security parameter.

Certain aspects of the subject matter described in this disclosure can be implemented in an apparatus for wireless communication. The apparatus generally includes means for sending a first service request to establish a connection with a network. The first service request is associated with a first security parameter. The apparatus also includes means for sending a second service request to the network after sending the first service request. The second service request is associated with a second security parameter. The apparatus further includes means for participating in a security mode command procedure with a base station, based on the first security parameter and the second security parameter.

Certain aspects can be implemented in a non-transitory computer-readable medium for wireless communication by a UE. The non-transitory computer-readable medium may comprise computer-executable instructions that, when executed by one or more processors of a processing system, cause the processing system to: send a first service request to establish a connection with a network, wherein the first service request is associated with a first security parameter; send a second service request to the network after sending the first service request, wherein the second service request is associated with a second security parameter; and participate in a security mode command procedure with a base station, based on the first security parameter and the second security parameter.

Certain aspects can be implemented in a computer program product for wireless communication by a UE embodied on a computer-readable storage medium. The computer-readable storage medium may include code for: sending a first service request to establish a connection with a network, wherein the first service request is associated with a first security parameter; sending a second service request to the network after sending the first service request, wherein the second service request is associated with a second security parameter; and participating in a security mode command procedure with a base station, based on the first security parameter and the second security parameter.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9 is a table showing example service type values for service requests, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
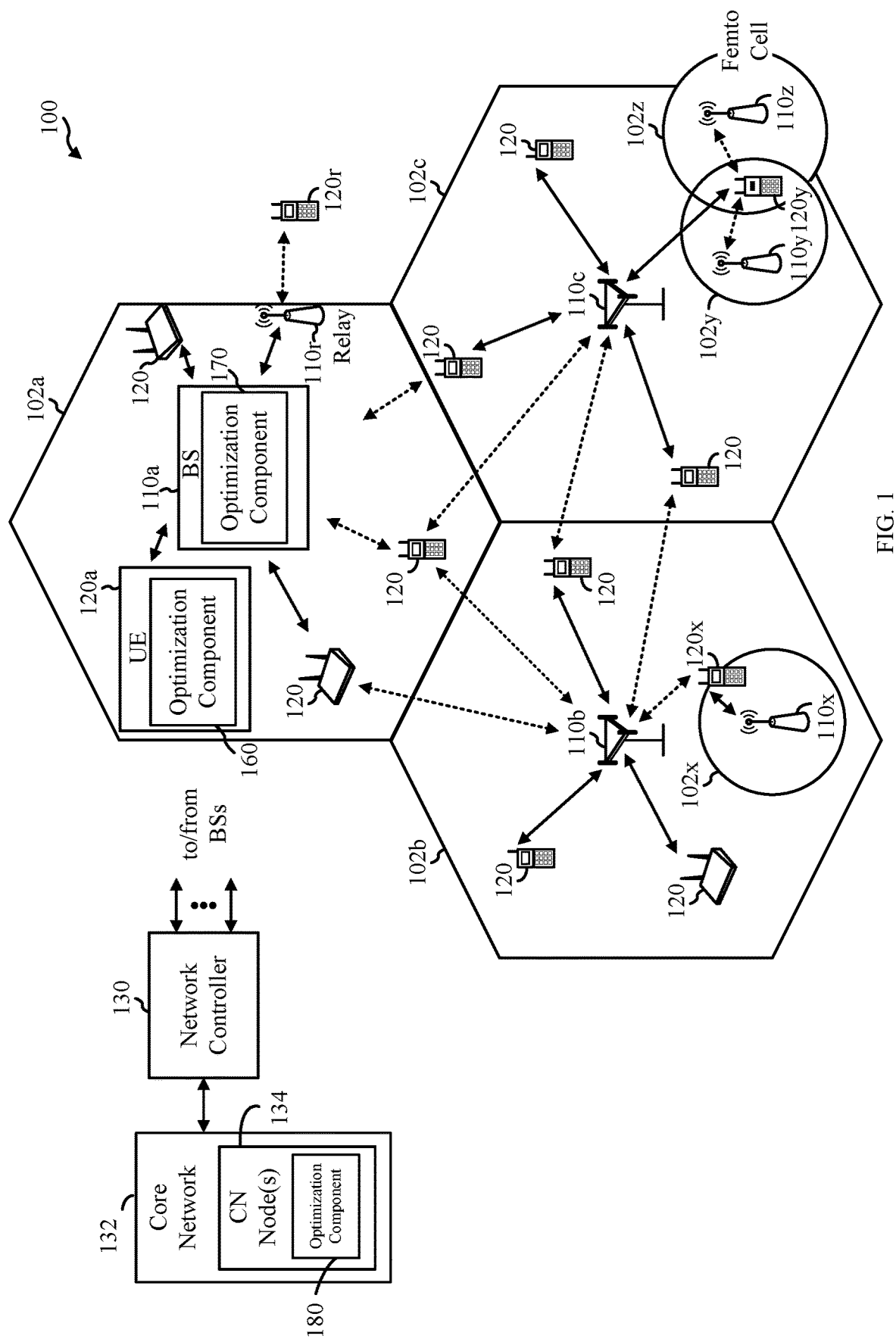
FIG. 1 is a block diagram conceptually illustrating an example telecommunications system, in accordance with certain aspects of the present disclosure.

Aspects of the present disclosure provide apparatus, methods, processing systems, and computer readable mediums for optimizing an initial access stratum (AS) security mode command (SMC) procedure, e.g., between a UE and a base station (BS).

In certain networks (e.g., LTE, NR, etc.), a UE may send a service request message to the network to request the establishment of a non-access stratum (NAS) signaling connection, establishment of signaling bearers, establishment of (data) radio bearers, etc. In one reference example, the UE may send the service request when the UE is in an idle mode (or state) (e.g., radio resource control (RRC)-Idle state) and wants to transition to an active mode (or state) (e.g., RRC-Connected state) in order to handle traffic with the network. Such traffic, for example, can include uplink traffic from the UE or downlink traffic from the network to the UE.

Within the protocol stack of the UE, the service request message may be initiated and sent by the NAS layer of the UE to the RRC layer of the UE. When sending the service request message, the NAS layer may indicate a (first) security parameter (e.g., freshness parameter) that is associated with the service request message. As described below, the security parameter may be used to perform integrity verification of an AS security mode command (SMC) message from a BS (e.g., for the AS SMC procedure between the UE and BS). One issue with this current procedure is that, in some cases, the NAS layer can subsequently send another service request (e.g., in the case of LTE, an emergency service request (ESR) for an emergency call, and in the case of NR, a service request having the same or different cause as the initial service request) having another (second) associated security parameter to the RRC layer before the RRC layer receives the AS SMC message from the BS. In these cases, when the RRC layer subsequently receives the AS SMC message from the BS (e.g., after transmission of the other service request to the BS), the RRC layer may attempt to use the other (second) security parameter to perform integrity verification of the AS SMC message, causing the integrity verification to fail (e.g., since the wrong security parameter was used). This failure can cause the RRC layer to send a failure indication to the network, which in turn can increase latency and reduce network performance.

To address this, aspects provide techniques for optimizing the initial AS SMC procedure in a robust manner. In one aspect described below, the UE may send a first service request to establish a connection with a network, where the first service request is associated with a first security parameter. The UE may then send a second service request having a second associated security parameter to the network, upon determining that one or more criteria is satisfied.

In one aspect, the one or more criteria may include completion of the AS SMC procedure. In one aspect, the one or more criteria may include receiving an AS SMC message associated with the first service request (as part of the AS SMC procedure). In one aspect, the one or more criteria may include receiving an indication that the first service request is accepted or an indication that the first service request is rejected. In one aspect, the one or more criteria may include receiving an indication that a data radio bearer has been established for the first service request. In some aspects, the UE may determine to buffer the second service request until a determination is made that the one or more criteria has been satisfied. In this manner, aspects can avoid the security parameter ambiguity that arises when the UE wishes to send another service request before an AS SMC message is received from a BS.

The following description provides examples of techniques for optimizing SMC procedures in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured to perform an AS SMC procedure in an optimized manner, relative to conventional techniques. As shown in FIG. 1, the UE 120a includes an optimization component 160, which is configured to perform one or more techniques described herein for optimizing an initial AS SMC procedure. Similarly, as shown in FIG. 1, the BS 170 may include an optimization component 170, which is configured to perform one or more techniques described herein for optimizing an initial AS SMC procedure. Further, as shown in FIG. 1, the CN node(s) 134 includes an optimization component 180, which is configured to perform one or more techniques described herein for optimizing an initial AS SMC procedure (e.g., between the UE 120a and BS 110a).

Figure 2:
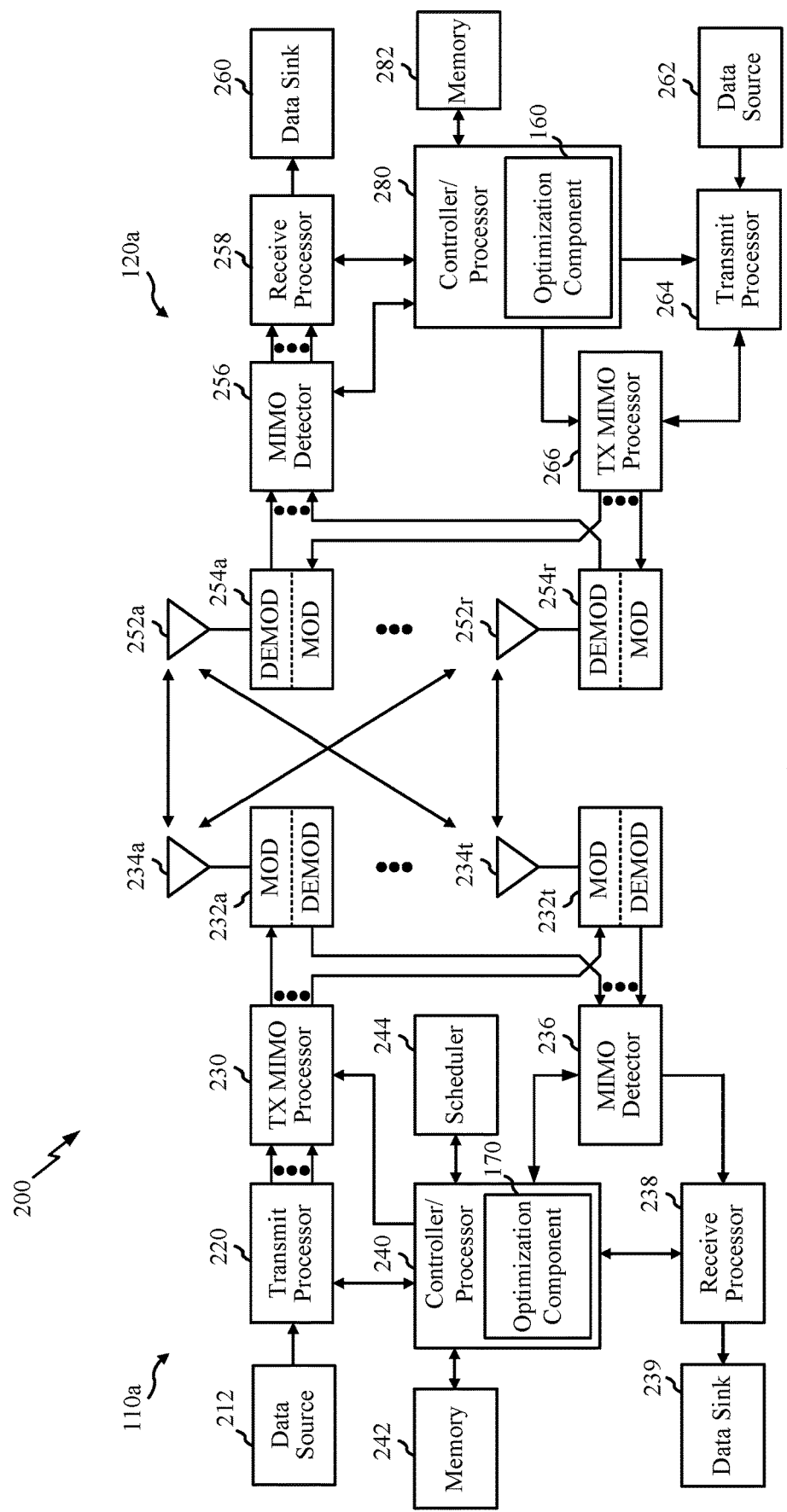
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an optimization component 170 that may be configured to perform one or more techniques described herein for optimizing an initial AS SMC procedure. As shown in FIG. 2, the controller/processor 280 of the UE 120a has an optimization component 160 that may be configured to perform one or more techniques described herein for optimizing an initial AS SMC procedure. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
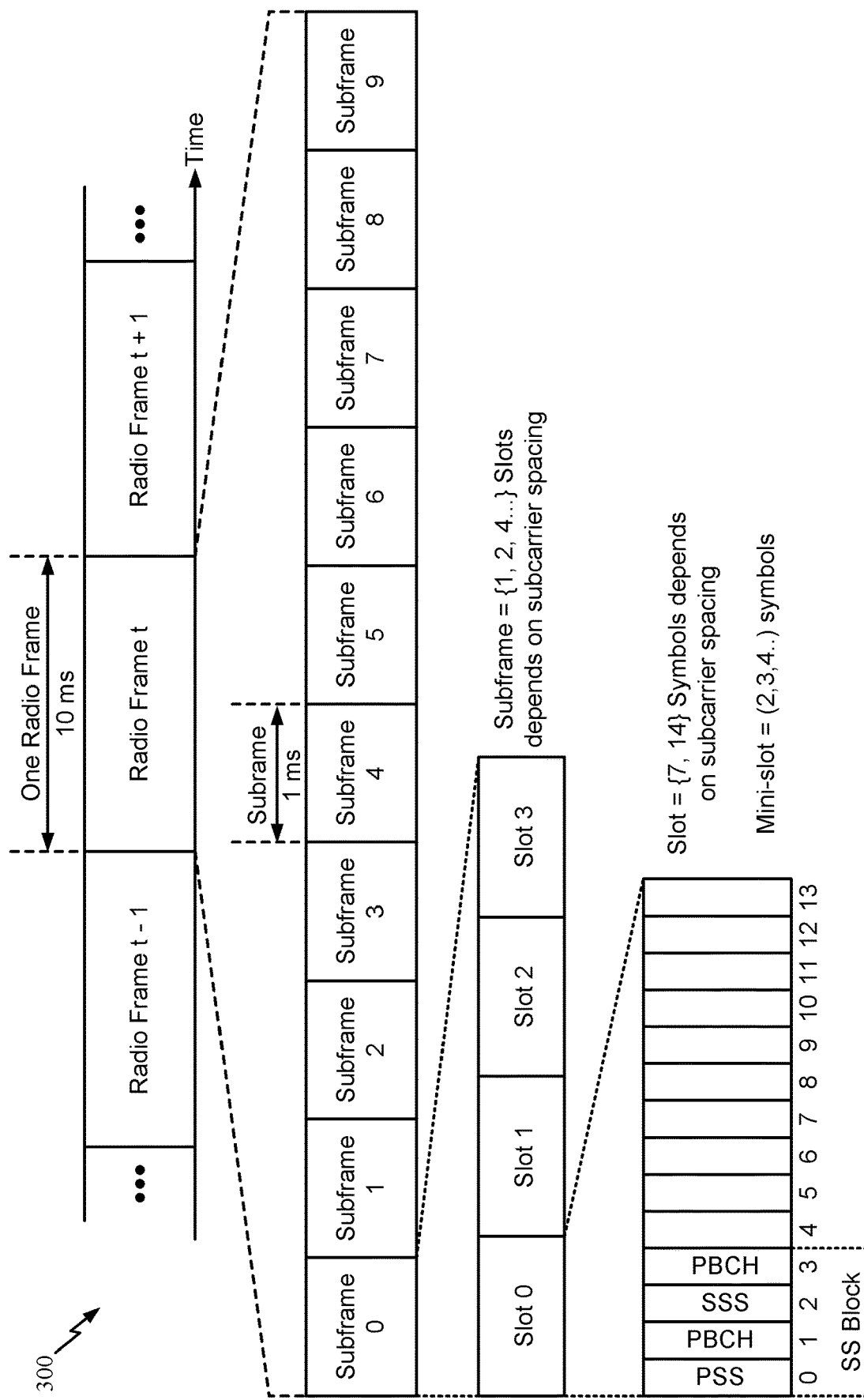
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 4:
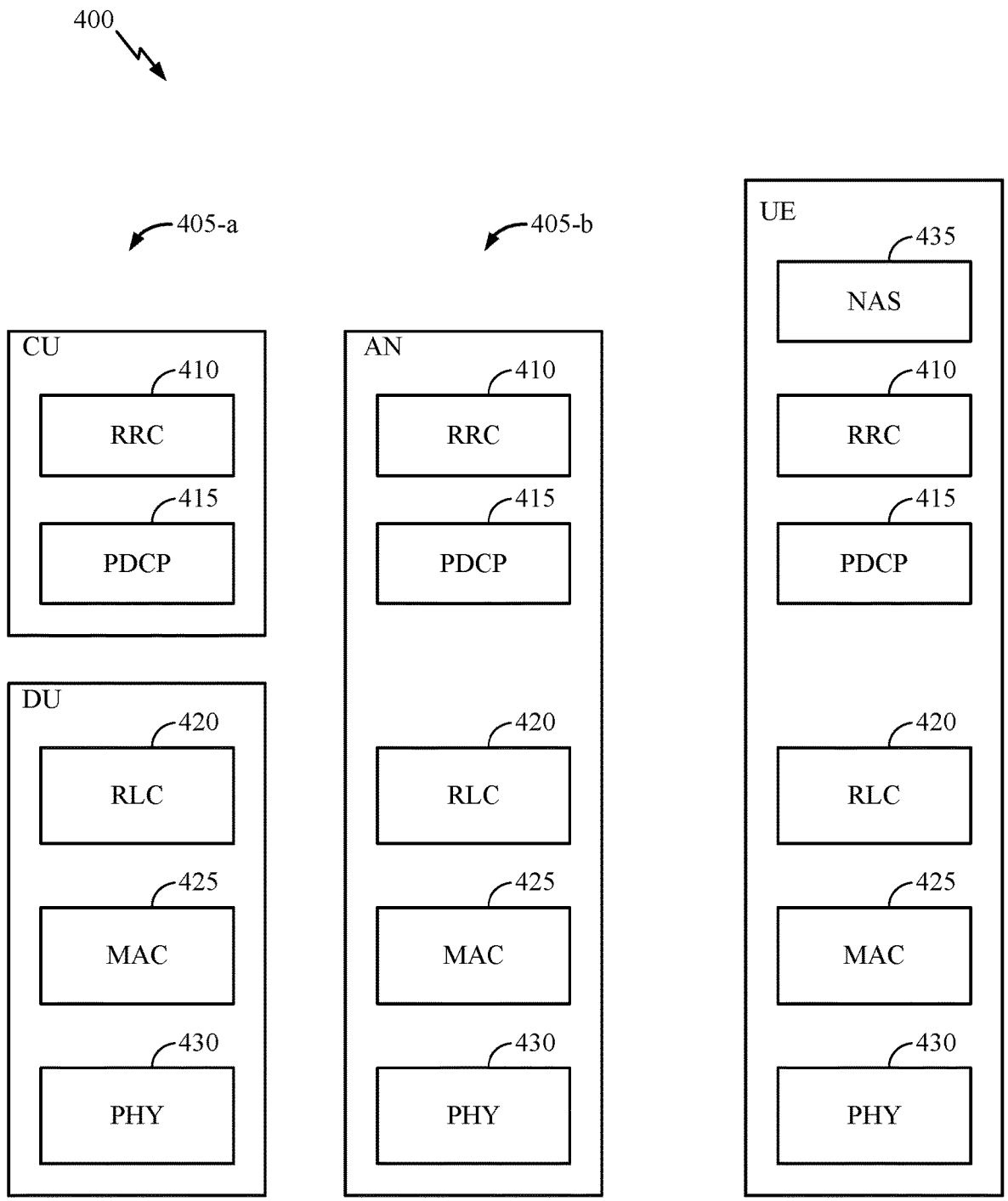
FIG. 4 is a diagram showing examples for implementing a communication protocol stack, in accordance with certain aspects of the present disclosure.

FIG. 4 illustrates a diagram 400 showing examples for implementing a communications protocol stack, according to aspects of the present disclosure. The illustrated communications protocol stacks may be implemented by devices operating in in a communications system (e.g., LTE, 5G, etc.). Diagram 400 illustrates a communications protocol stack including a Non-Access Stratum (NAS) layer 435, a Radio Resource Control (RRC) layer 410, a Packet Data Convergence Protocol (PDCP) layer 415, a Radio Link Control (RLC) layer 420, a Medium Access Control (MAC) layer 425, and a Physical (PHY) layer 430. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., access nodes (ANs), central units (CUs), and/or distributed units (DUs)) or a UE.

A first option 405-a shows a split implementation of a protocol stack, in which implementation of the protocol stack is split between a centralized network access device (e.g., CU) and distributed network access device (e.g., DU). In the first option 405-a, an RRC layer 410 and a PDCP layer 415 may be implemented by the CU, and an RLC layer 420, a MAC layer 425, and a PHY layer 430 may be implemented by the DU. In various examples the CU and the DU may be collocated or non-collocated. The first option 405-a may be useful in a macro cell, micro cell, or pico cell deployment.

A second option 405-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 410, the PDCP layer 415, the RLC layer 420, the MAC layer 425, and the PHY layer 430 may each be implemented by the AN. The second option 405-b may be useful in a femto cell deployment.

Regardless of whether a network access device implements part or all of a protocol stack, a UE may implement an entire protocol stack (e.g., NAS layer 435, the RRC layer 410, the PDCP layer 415, the RLC layer 420, the MAC layer 425, and the PHY layer 430).

A UE may be in one of a plurality of operating states. One of the states may be referred to as an RRC_IDLE state. In the RRC_IDLE state, the UE may not have an active connection to an AN, and the AN does not have a context for the UE.

Another of the operating states may be an inactive state. In the inactive state, there is a UE context in the AN, but no active connection between the UE and the AN. The inactive state may be referred to as "RRC_COMMON," "RRC_I-NACTIVE," "RRC_DORMANT," or as an "inactive state in RRC_CONNECTED mode" and such terms are used interchangeably herein. In the inactive state, the UE does not have any dedicated resources (e.g., time and frequency resources for the UE to transmit on that other UEs are not also transmitting on, time and frequency resources for signals that only the UE is intended to receive). The UE may monitor a paging channel with a long discontinuous reception (DRX) cycle (e.g., around 320 ms to 2560 ms). The UE can receive multimedia broadcast multicast service (MBMS) data while in this state. If the UE obtains data to transmit (e.g., a user activates the UE to start a voice call) to the network (e.g., to a BS or via a BS to another entity), then the UE can perform either a state transition procedure into RRC_CONNECTED mode (e.g., by sending an RRC connection resume message to an AN) or a data transmission procedure that may include contention based access (e.g., performing a contention procedure to access a BS).

Another of the operating states may be an active state. In the active state, there is a UE context in the AN and an active connection between the UE and the AN. In the active state, the UE may have dedicated resources for transmissions to or from the AN and other devices. The active state may be referred to as "RRC_CONNECTED mode," "RRC_CONNECTED active state," "RRC_DEDICATED," "RRC_ACTIVE," or "active state in RRC_CONNECTED mode" and such terms are used interchangeably herein. When the AN obtains information that the AN should set up an RRC connection with dedicated resources for the UE (e.g., the AN receives an RRC connection resume request message from the UE, the AN obtains data to be transmitted to the UE), then the AN may send a transmission (e.g., a page) to the UE to cause the UE to transition to the active state. When the AN acknowledges the RRC connection resume request message, then the UE may enter the active state.

As noted above, in some cases, the conventional procedure for initiating an AS SMC procedure can lead to UE ambiguity in determining which security parameter(s) should be used for the integrity verification of the AS SMC message from the BS.

In LTE, for example, as a result of the (extended) NAS service request, radio bearers may be established and the BS (e.g., eNB) may send an AS SMC message to the UE. When the UE receives the AS SMC without having received a NAS SMC, the UE may use the NAS uplink COUNT that triggered the AS SMC as the freshness parameter (e.g., security parameter) in the derivation of the security key for the BS (e.g., $K_{eNB}$). However, there may be an ambiguity from the UE point of view regarding which freshness parameter (e.g., the freshness parameter that was sent with the initial service request or the freshness parameter that was sent with the subsequent service request) is the one to trigger the AS SMC message.

Figure 5:
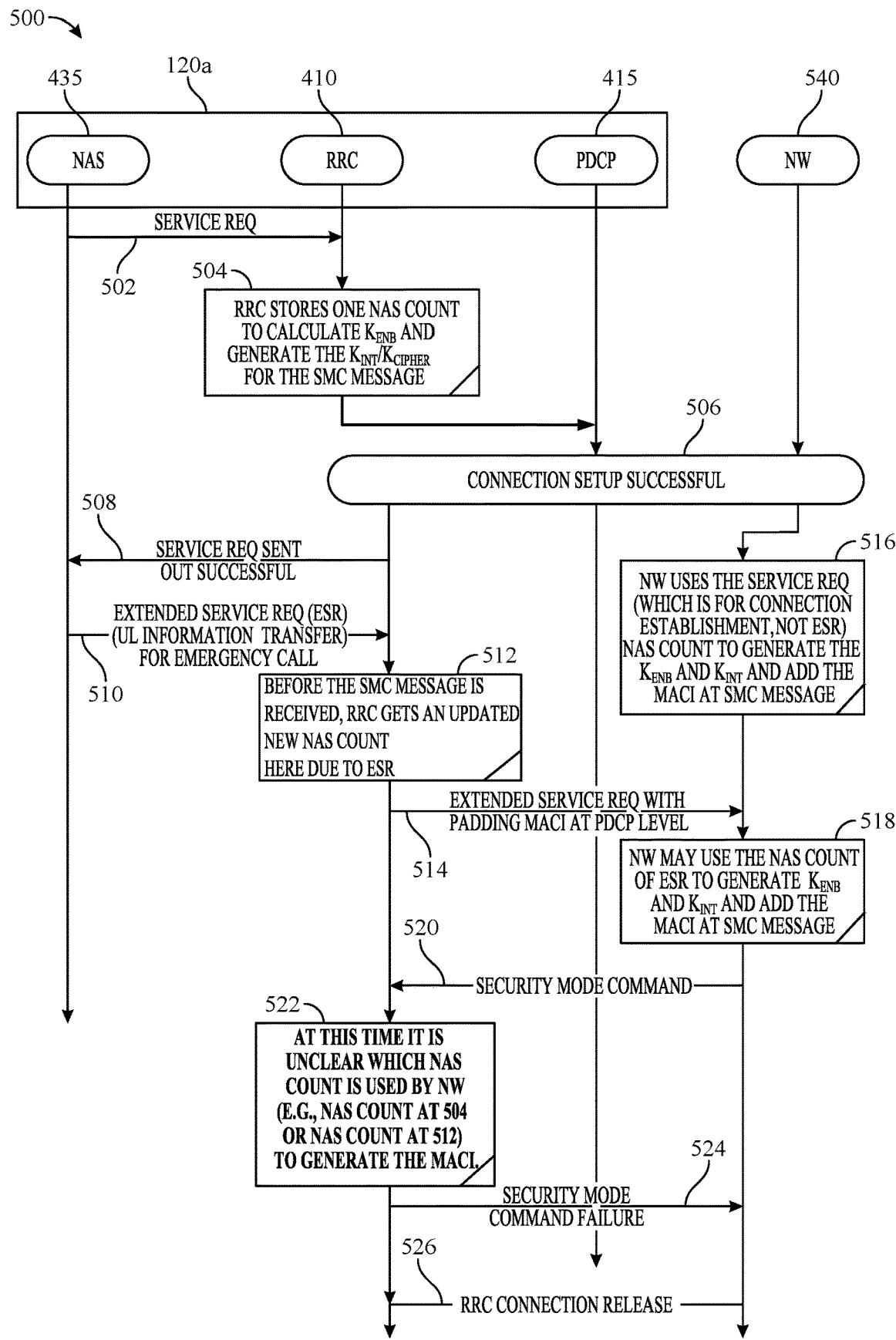
FIG. 5 is a call flow diagram illustrating example signaling for connecting to a network.

FIG. 5 illustrates an example call flow 500 for attempting to connect to a network (e.g., LTE communication network). Here, the one or more layers of the UE 120a (e.g., NAS layer 435, RRC layer 410, PDCP layer 415) may communicate with the network 540 (e.g., BS 110a, such as an eNB). As shown, the NAS layer 435 of the UE 120a may initiate an attempt to connect to the network 540 by sending a service request to the RRC layer 410 of the UE 120a (502). Once received, the RRC layer 410 may store a NAS uplink count (e.g., security parameter) associated with the service request (504). This NAS count may be used to calculate (or derive) a security key for the BS (e.g., eNB specific key, $K_{eNB}$). The BS security key can then be used to derive a set of control plane keys that can be used for integrity verification of an AS SMC message. These control plane keys can include, for example, a control plane encryption key ($K_{RRCent}$) and a control plane integrity protection key ($K_{int}$)/cipher ($K_{cipher}$). After connection setup with the network 540 (506), the RRC layer 410 may send an indication to the NAS layer 435 that a successful service request was sent out to the network 540 (508).

At 510, the NAS layer 435 may initiate and send a second service request to the RRC layer 410 in order to initiate another connection with the network 540. Here, the NAS layer 435 sends an extended service request (ESR) in order to send UL information for an emergency call. When the RRC layer 410 receives the second service request, the RRC layer 410 may receive an indication of another NAS uplink count (prior to receiving the SMC message) (512). Meanwhile, the network 540 may use the initial service request from the UE for the connection establishment (e.g., service request sent in 502) and its associated NAS uplink count to generate the set of control plane keys ($K_{eNB}$, $K_{int}$, etc.) and add the message authentication code (MAC)-integrity (MAC-I) to the AS SMC message (516). When the network 540 receives the ESR from the UE 120a (514), the network 540 may also use the NAS uplink count associated with the ESR message to generate a set of control plane keys and MAC-I for the AS SMC message (518).

At 520, the UE receives the AS SMC message (at the RRC layer 410). However, at this point in time (e.g., when the AS SMC message is received after the UE has sent two service requests), it may be unclear to the UE which NAS uplink count (e.g., the first NAS uplink count associated with the service request at 502 or the second NAS uplink count associated with the ESR at 510) has been used by the network 540 to generate the MAC-I for the AS SMC message (522). Thus, when the UE attempts to verify the AS SMC message based on a MAC-I derived using the incorrect NAS uplink count, the verification can fail and the UE can send a SMC failure indication to the network 540 (524). The RRC connection may then be released (526).

A similar ambiguity issue regarding which security parameter is used for the AS SMC message can arise in NR. For example, in NR, as a result of the NAS service request, with PDU session(s) to be re-activated, radio bearers may be established and the BS 110a (e.g., gNB/ng-eNB) can send an AS SMC message to the UE. When the UE receives the AS SMC message without having received a NAS SMC, it can use the NAS uplink COUNT of the NAS message that triggered the AS SMC as the freshness parameter (e.g., security parameter) in the derivation of the BS security key (e.g., $K_{gNB}/K_{cNB}$). However, there may be an ambiguity from the UE point of view regarding which freshness parameter (e.g., the freshness parameter that was sent with the initial service request or the freshness parameter that was sent with the subsequent service request) is the one to trigger the AS SMC message.

Figure 6:
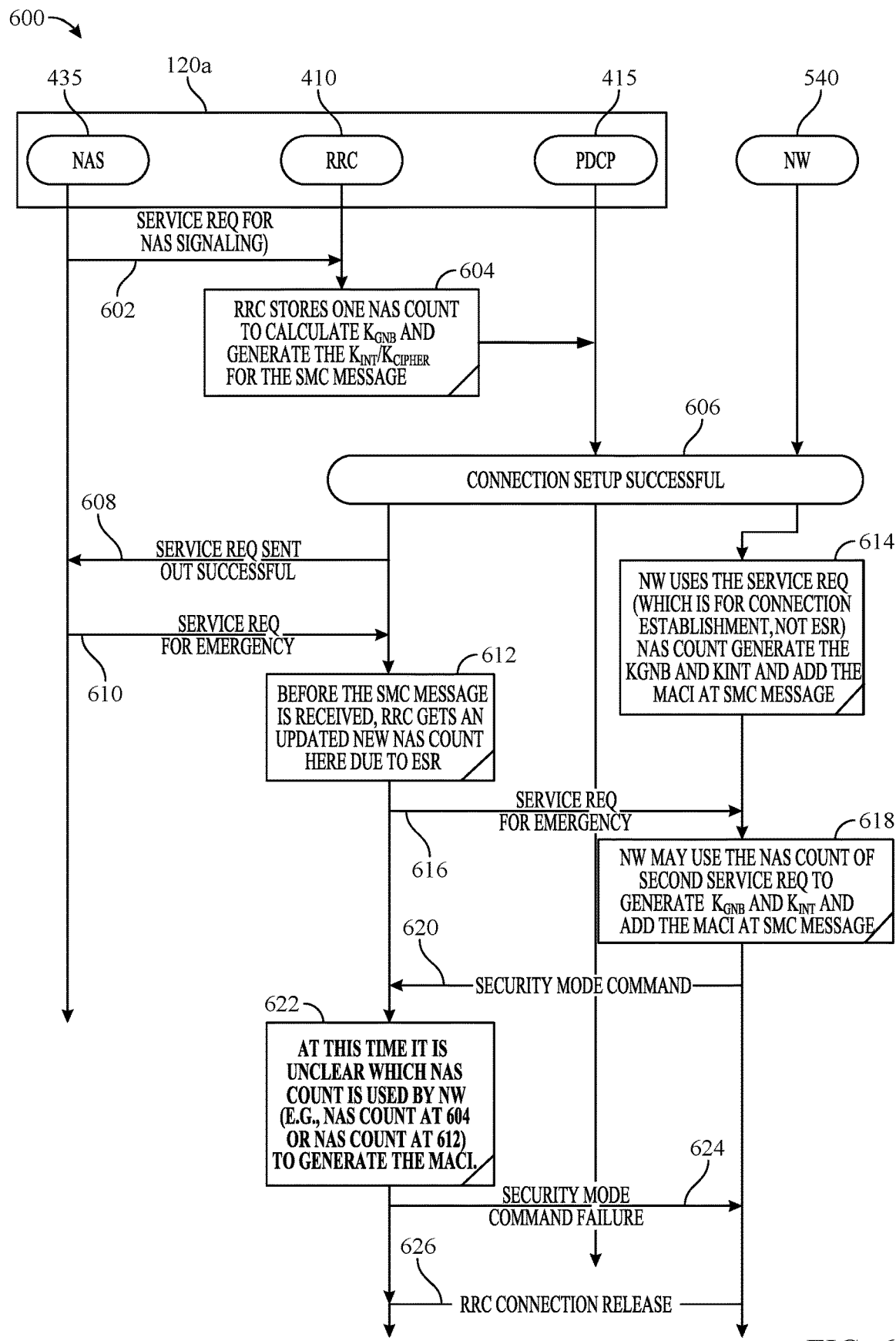
FIG. 6 is another call flow diagram illustrating example signaling for connecting to a network.

FIG. 6 illustrates an example call flow 600 for attempting to connect to a network (e.g., NR communication network). Here, the one or more layers of the UE 120a (e.g., NAS layer 435, RRC layer 410, PDCP layer 415) may communicate with the network 640 (e.g., BS 110a, such as a gNB). As shown, the NAS layer 435 of the UE 120a may send a service request to establish a NAS signaling connection with the network 640 (602). Once received, the RRC layer 410 may store a NAS uplink count (e.g., security parameter) associated with the service request (604). This NAS count may be used to calculate (or derive) a security key for the BS (e.g., BS specific key, $K_{gNB}$). The BS security key can then be used to derive a set of control plane keys that can be used for integrity verification of an AS SMC message. These control plane keys can include, for example, a control plane encryption key ($K_{RRCent}$) and a control plane integrity protection key ($K_{int}$)/cipher ($K_{cipher}$). After connection setup with the network 640 (606), the RRC layer 410 may send an indication to the NAS layer 435 that a successful service request was sent out to the network 640 (608).

At 610, the NAS layer 435 may initiate and send a second service request to the RRC layer 410 in order to initiate another connection with the network. Here, the NAS layer 435 sends a service request for an emergency call. Note, however, that the NAS layer 435 can send a service request for other reasons or service types. When the RRC layer 410 receives the second service request, the RRC layer 410 may receive an indication of another NAS uplink count (prior to receiving the SMC message) (612). Meanwhile, the network 640 may use the initial service request from the UE for the establishment of NAS signaling (e.g., service request sent in 602) and its associated NAS uplink count to generate the set of control plane keys ($K_{gNB}$, $K_{int}$, etc.) and add the MAC-I to the AS SMC message (614). When the network 640 receives the service request for emergency from the UE 120a (616), the network 640 may also use the NAS uplink count associated with the service request for emergency to generate a set of control plane keys and MAC-I for the AS SMC message (618).

At 620, the UE receives the AS SMC message (at the RRC layer 410). However, at this point in time (e.g., when the AS SMC message is received after the UE has sent two service requests), it may be unclear to the UE which NAS uplink count (e.g., the first NAS uplink count associated with the service request at 602 or the second NAS uplink count associated the service request for emergency at 610) has been used by the network 640 to generate the MAC-I for the AS SMC message. Thus, when the UE attempts to verify the AS SMC message based on a MAC-I derived using the incorrect NAS uplink count, the verification may fail and the UE may send a SMC failure indication to the network 640 (624). The RRC connection may then be released (626).

Accordingly, it may be desirable to provide techniques and apparatus to resolve the ambiguity in determining which security parameter to use for integrity verification of an AS SMC message during an AS SMC procedure.

Example Optimization for an Initial Access Stratum Security Mode Command Procedure Aspects of the present disclosure provide techniques and apparatus for optimizing an AS SMC procedure between a UE and BS (e.g., eNB, gNB, etc.). As described below, after the UE sends a first (initial) service request (having an associated first security parameter) to establish a connection with a network, the UE may wait until one or more criteria are met before sending a second service request (having an associated second security parameter) to the network. Once the UE determines the criteria are met, the UE may then send the second service request. As described below, the one or more criteria can include completion of an AS SMC procedure with the BS, receipt of an AS SMC message (triggered by the first service request), acceptance of the first service request, rejection of the first service request, establishment of a data radio bearer, establishment of a signaling radio bearer, etc.

Figure 7:
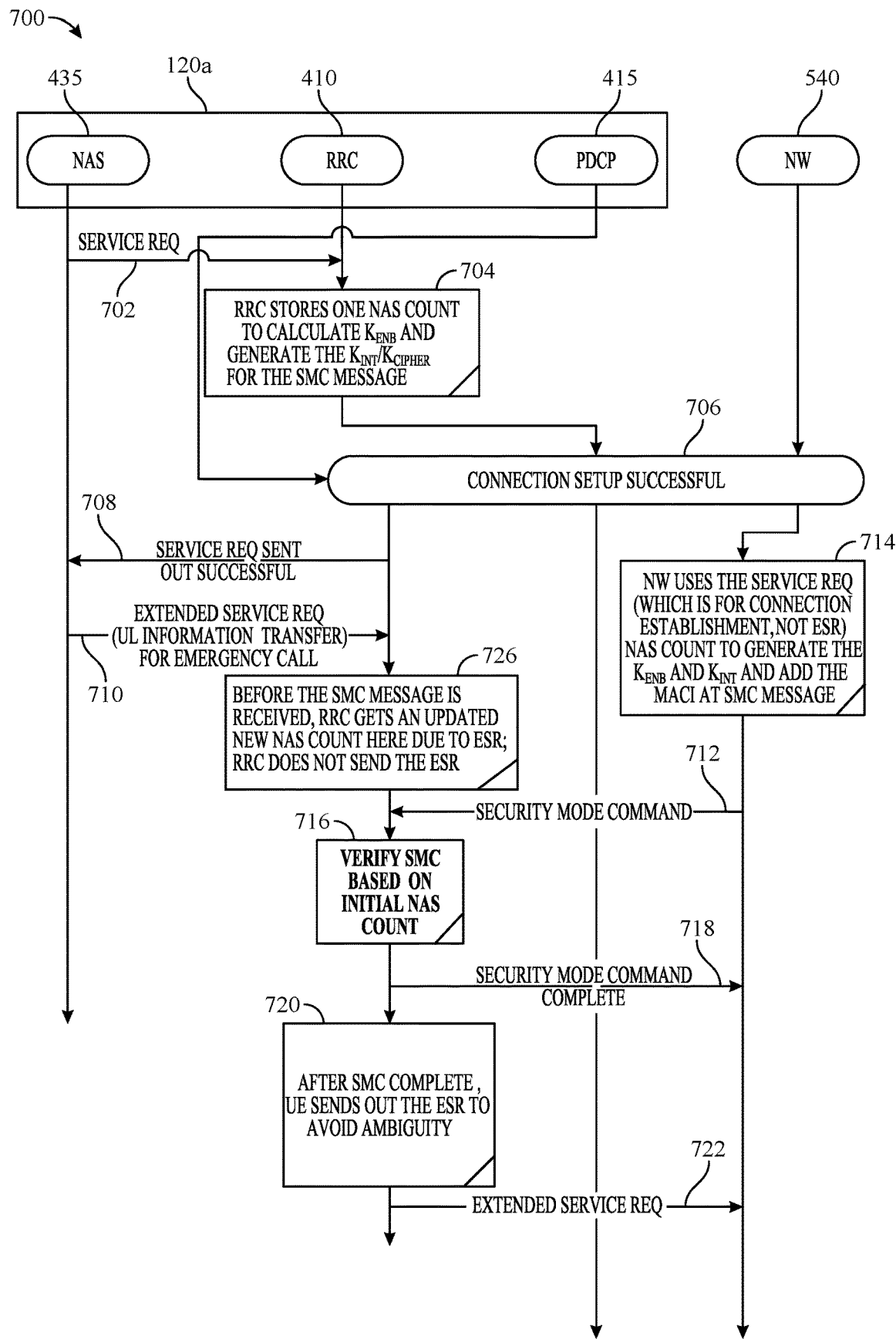
FIG. 7 is a call flow diagram illustrating example optimized signaling for connecting to a network, in accordance with aspects of the present disclosure.

FIG. 7 illustrates an example call flow 700 for attempting to connect to a network (e.g., LTE communication network), according to certain aspects presented herein. Relative to call flow 500, the call flow 700 is an optimized call flow that can be used to resolve the ambiguity regarding which security parameter is used for an AS SMC procedure. Note that steps 702, 704, 706, 708, 710, and 714 in call flow 700 are similar to steps 502, 504, 506, 508, 510, and 514, respectively, which are described in more detail above.

Compared to call flow 500, after the RRC layer 410 receives an extended service request for an emergency call (e.g., after receiving an initial service request in 702 to establish a connection with the network 540) (710), the RRC layer 410 may not automatically send the extended service request to the network 540 (726). The extended service request may have an associated (updated) NAS uplink count that is different from the NAS uplink count associated with the initial service request. At 712, the RRC layer 410 receives the AS SMC message and, at 716, the RRC layer 410 verifies the AS SMC message in part based on the initial NAS uplink count (as opposed to the updated NAS uplink count) received with the extended service request. After verification, the RRC layer 410 sends an indication of SMC complete to the network 540 (718). After the SMC procedure is completed (e.g., a predetermined criterion is satisfied), the RRC layer 410 sends the extended service request to the network 540 (720, 722). Note that other predetermined criteria can include receiving of the AS SMC message (712), receiving an indication that a data radio bearer/signaling radio bearer is established, receiving an indication that the first service request is accepted, receiving an indication that the first service request is rejected, etc. In this manner, the UE can avoid the ambiguity regarding which NAS uplink count is used for the MAC-I of the AS SMC message.

Figure 8:
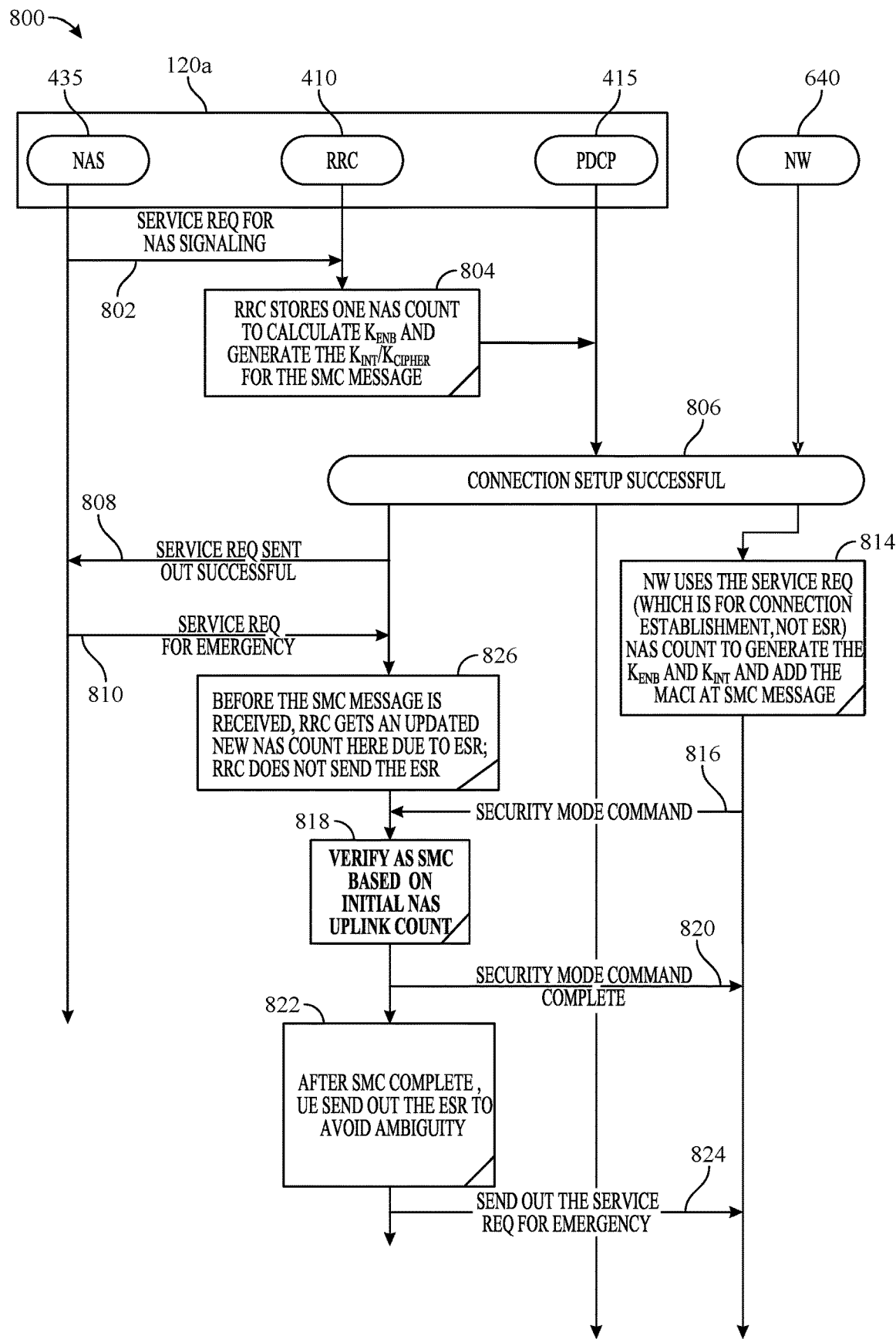
FIG. 8 is another call flow diagram illustrating example optimized signaling for connecting to a network, in accordance with aspects of the present disclosure.

FIG. 8 illustrates an example call flow 800 for attempting to connect to a network (e.g., NR communication network), according to certain aspects presented herein. Relative to call flow 600, the call flow 800 is an optimized call flow that can be used to resolve the ambiguity regarding which security parameter is used for an AS SMC procedure. Note that steps 802, 804, 806, 808, 810, and 814 in call flow 700 are similar to steps 602, 604, 606, 608, 610, and 614, respectively, which are described in more detail above.

Compared to call flow 600, after the RRC layer 410 receives a service request for an emergency call (e.g., after receiving an initial service request in 802 to establish a NAS signaling connection with the network 640) (810), the RRC layer 410 may not automatically send the service request to the network 640 (826). The service request for the emergency call may have an associated (updated) NAS uplink count that is different from the NAS uplink count associated with the initial service request. At 816, the RRC layer 410 receives the AS SMC message and, at 818, the RRC layer 410 verifies the AS SMC message in part based on the initial NAS uplink count (as opposed to the updated NAS uplink count) received with the service request for the emergency call. After verification, the RRC layer 410 sends an indication of SMC complete to the network 640 (820). After the SMC procedure is completed (e.g., a predetermined criterion is met), the RRC layer 410 sends the service request for the emergency call to the network 640 (822, 824). Note that other predetermined criteria can include receipt of the AS SMC message (816), receiving an indication that a data radio bearer/signaling radio bearer is established, receiving an indication that the first service request is accepted, receiving an indication that the first service request is rejected, etc. In this manner, the UE can avoid the ambiguity regarding which NAS uplink count is used for the MAC-I of the AS SMC message.

Note that while FIG. 8 depicts the UE sending a service request for NAS signaling in step 802 and a service request for emergency in step 810, the UE may send a service request for different service types in steps 802 and 810. FIG. 9, for example, shows a table 900 of different service types 902 (also referred to as service reasons) that can be used for the service requests in steps 802 and 810.

Figure 10:
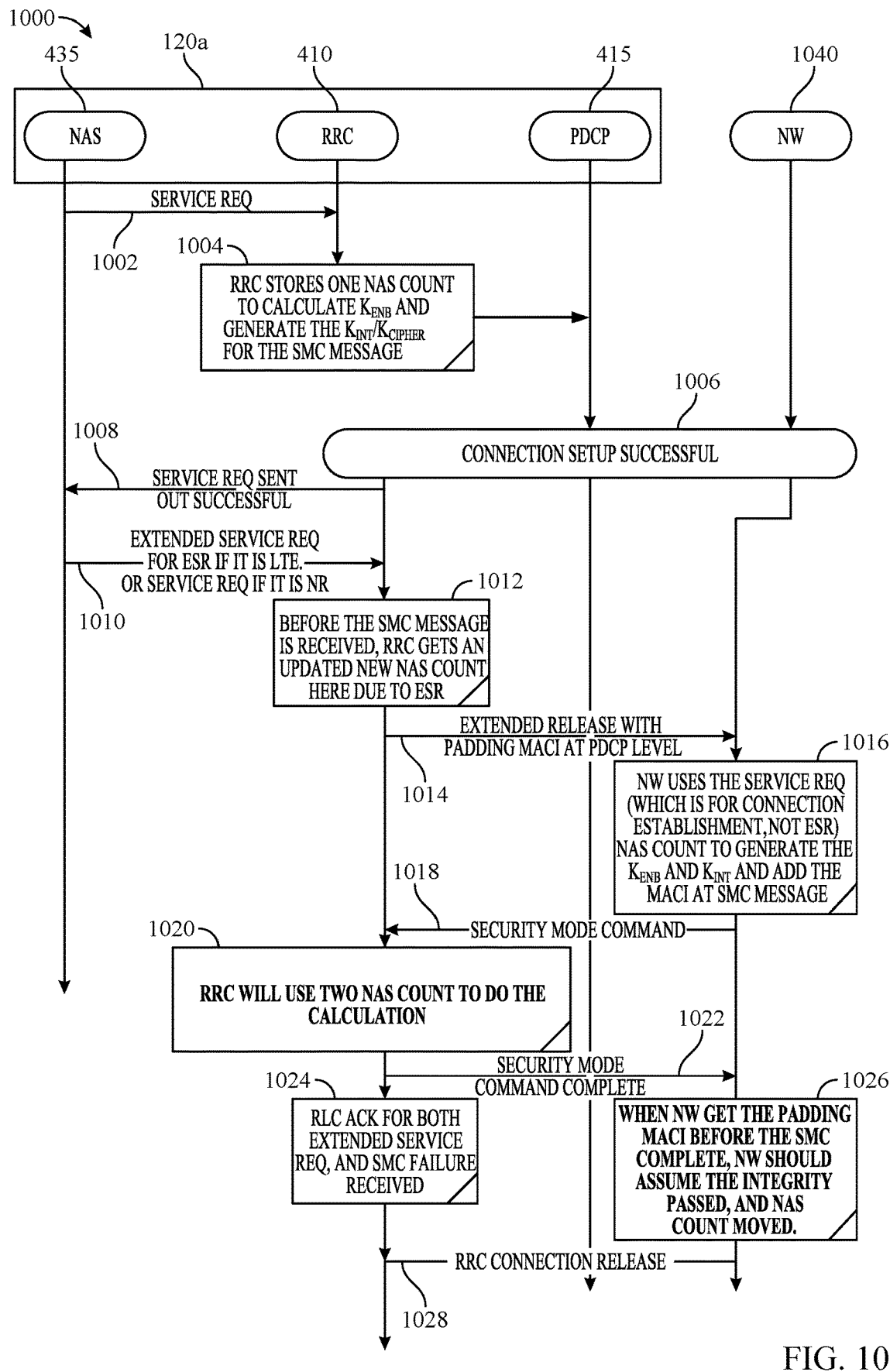
FIG. 10 is another call flow diagram illustrating example optimized signaling for connecting to a network, in accordance with aspects of the present disclosure.

FIG. 10 an example call flow 1000 for attempting to connect to a network (e.g., LTE communication network, NR communication network, etc.), according to certain aspects presented herein. At 1002, the NAS layer 435 sends a service request to the RRC layer 410 in order to establish a connection with the network 1040 (e.g., eNB, gNB, etc.). At 1004, the RRC layer 410 stores a NAS uplink count associated with the service request. After a successful connection setup (1006), the RRC layer 410 sends an indication of the successful service request to the NAS layer 435 (1008).

At 1010, the NAS layer 435 send another service request to the RRC layer 410. This other service request may be an emergency service request for LTE or one of the service types 902 in FIG. 9 for NR. At 1012, the RRC layer 410 determines another NAS uplink count associated with the other service request before receiving an AS SMC message. At 1014, the RRC layer 410 sends an indication of the service request received in 1010 to the network 1040. At 1016, the network 1040 can use the service request for the connection establishment (e.g., the service request in 1002) and its associated NAS uplink count to generate the $K_{eNB}$/$K_{gNB}$ and $K_{int}$ and calculate the MAC-I for the AS SMC message. Note, however, that in some cases, the network 1040 can use the other service request (e.g., the service request in 1010) and its associated NAS uplink count for the control plane keys and MAC-I for the AS SMC message.

At 1018, the RRC layer 410 receives an AS SMC message from the network 1040. At 1020, the RRC layer 410 can use both NAS uplink counts to verify the integrity of the AS SMC message. For example, the RRC layer 410 can first attempt to verify the integrity of the AS SMC message with the initial NAS uplink count. If the integrity fails, the RRC layer can attempt to verify the integrity of the AS SMC message with the subsequent NAS uplink count. At 1020, the RRC layer 410 can send a SMC complete message to the network 1040. In some cases, when the network 1040 gets the padding MAC-I before the SMC complete message, the network 1040 can assume that the integrity passed and that the NAS uplink count moved (1026). At 1028, the RRC connection may be released.

Figure 11:
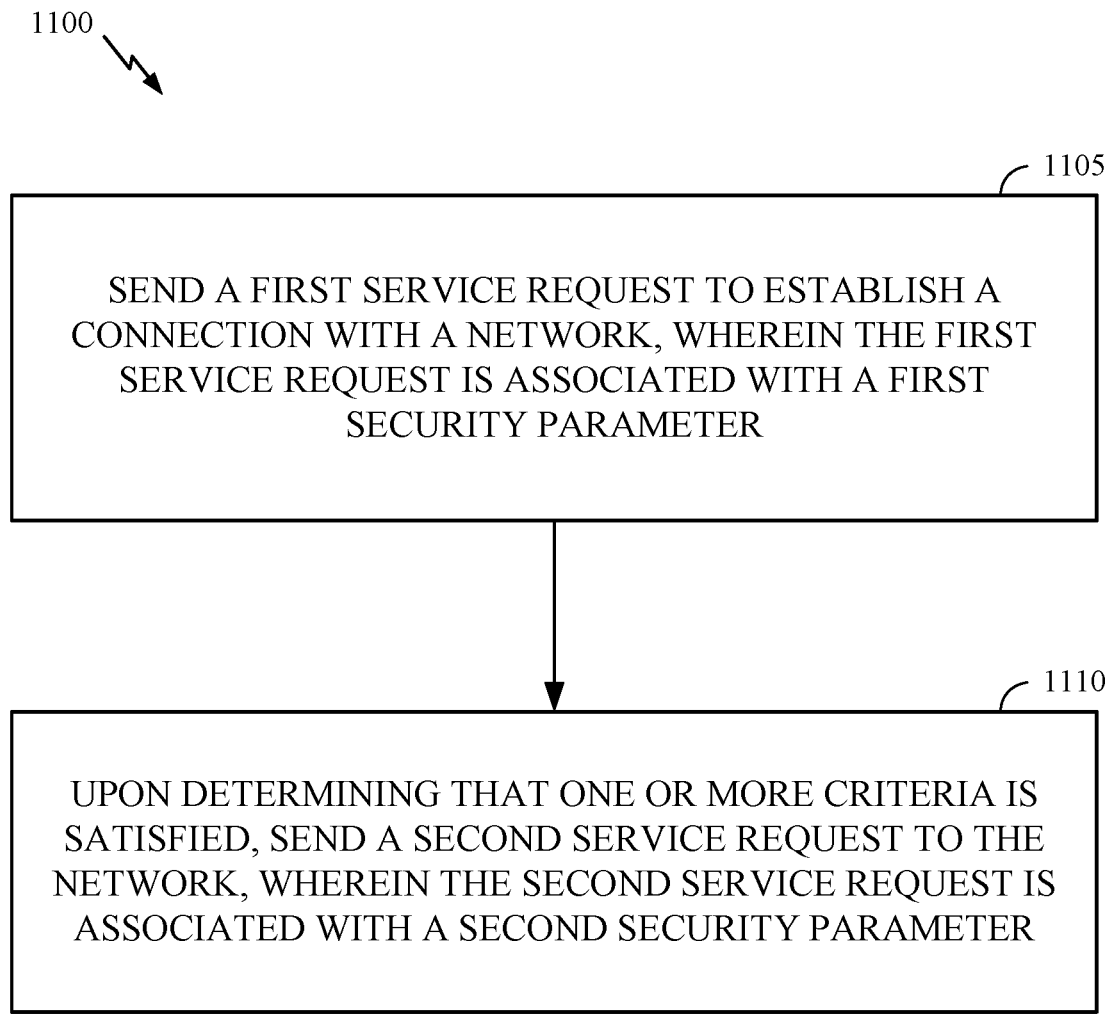
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by UE (e.g., such as a UE 120a in the wireless communication network 100). Operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at 1105, where the UE sends a first service request to establish a connection with a network (e.g., step 702, step 802). The first service request is associated with a first security parameter (e.g., step 704, step 804). The first security parameter may include a first NAS uplink count. At 1110, the UE sends a second service request to the network, upon determining that one or more criteria is satisfied (e.g., step 720, step 822). The second service request is associated with a second security parameter. The second security parameter may include a different second NAS uplink count.

In one aspect, the operations 1100 may further include generating the second service request after sending the first service request and prior to determining that the one or more criteria is satisfied (e.g., step 710, step 810). In some aspects, the operations 1100 may further include buffering the second service request until determining that the one or more criteria is satisfied. After generating the second service request, the operations 1100 may further include participating in a SMC procedure with a base station (e.g., steps 712, 716, and 718 in FIG. 7, steps 816, 818, and 820 in FIG. 8, etc.). In one aspect, the one or more criteria may include completion of the SMC procedure (e.g., step 720, step 822). In one aspect, the one or more criteria may include receipt of an AS SMC message (e.g., step 712 in FIG. 7, step 816 in FIG. 8).

In one aspect, participating in the SMC procedure with the base station may include (i) receiving an AS SMC message from the base station (e.g., step 712, step 816) and (ii) performing an integrity verification of the AS SMC message, based at least in part on the first security parameter (e.g., step 716, step 818).

In one aspect, the one or more criteria may include a receiving an indication that the first service request is accepted or an indication that the first service request is rejected. In one aspect, the one or more criteria may include receiving an indication that a data radio bearer has been established for the first service request.

In one aspect, the first service request may be associated with a first service type and the second service request may be associated with a second service type. The first service type may be the same or different than the second service type. In some aspects, the first service type and the second service type may be selected from multiple service types that include, for example, signaling bearers, data bearers, mobile terminated services, emergency services, emergency services fallback, high priority access, elevated signaling, etc.

Figure 12:
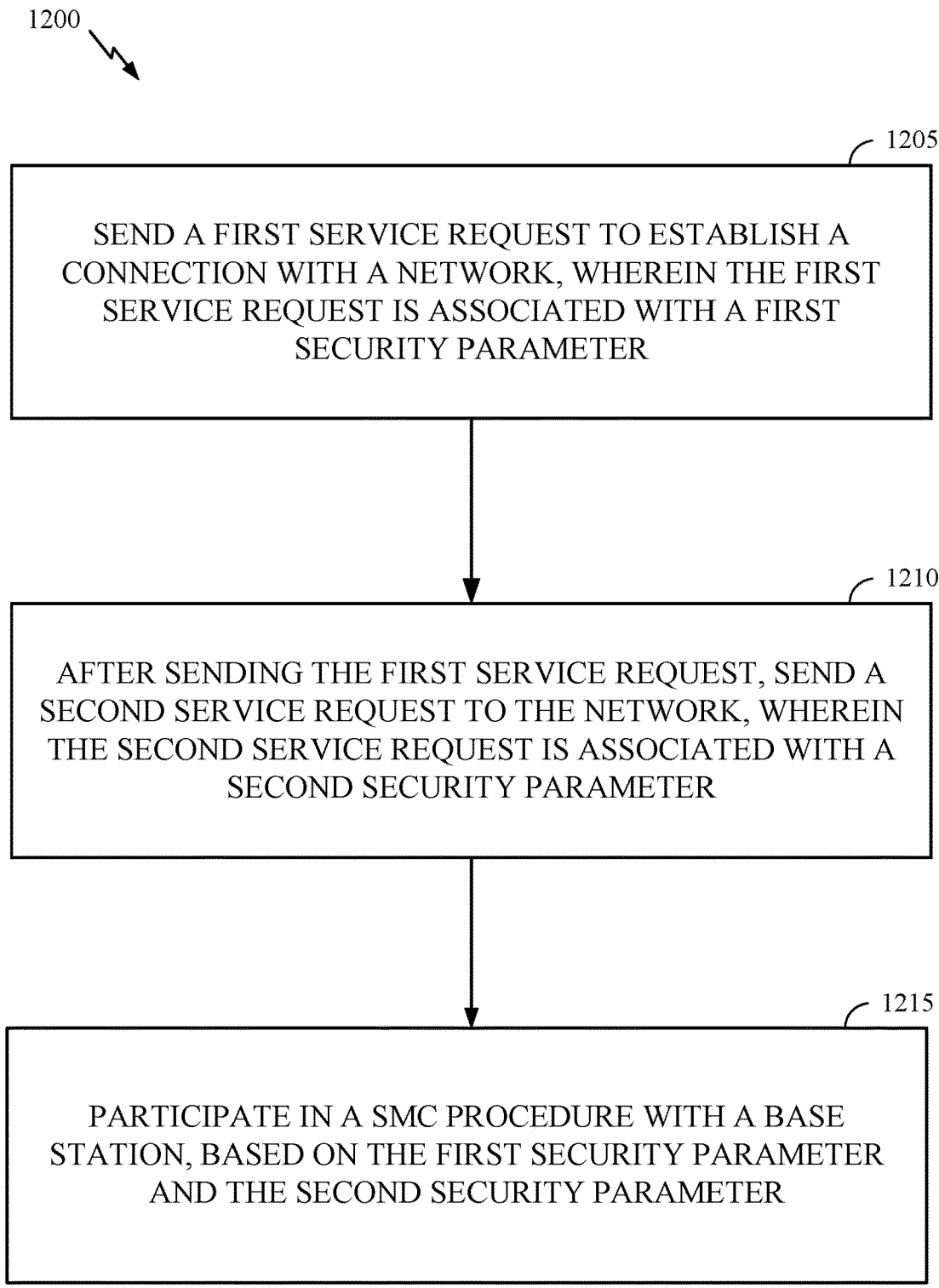
FIG. 12 is a flow diagram illustrating example operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed, for example, by UE (e.g., such as a UE 120a in the wireless communication network 100). Operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may begin, at 1205, where the UE sends a first service request to establish a connection with a network (e.g., step 1002). The first service request may be associated with a first security parameter (e.g., step 1004). At 1210, the UE sends a second service request to the network, after sending the first service request (e.g., step 1010). The second service request may be associated with a second security parameter (e.g., step 1012). At 1215, the UE participates in a SMC procedure with a base station, based on the first security parameter and the second security parameter (e.g., steps 1018, 1020, and 1022). The first security parameter may include a first NAS uplink count and the second security parameter may include a different second NAS uplink count.

In some aspects, participating in the SMC procedure may include (i) receiving an AS SMC message from the base station (e.g., step 1018) and (ii) performing a first integrity verification of the AS SMC message, based at least in part on the first security parameter (e.g., step 1020). In some aspects, participating in the SMC procedure may further include performing a second integrity verification of the AS SMC message, based at least in part on the second security parameter, upon determining that the first integrity verification of the AS SMC message failed (e.g., step 1020).

In one aspect, the first service request may be associated with a first service type and the second service request may be associated with a second service type. The first service type may be the same or different than the second service type. In some aspects, the first service type and the second service type may be selected from multiple service types that include, for example, signaling bearers, data bearers, mobile terminated services, emergency services, emergency services fallback, high priority access, elevated signaling, etc.

Figure 13:
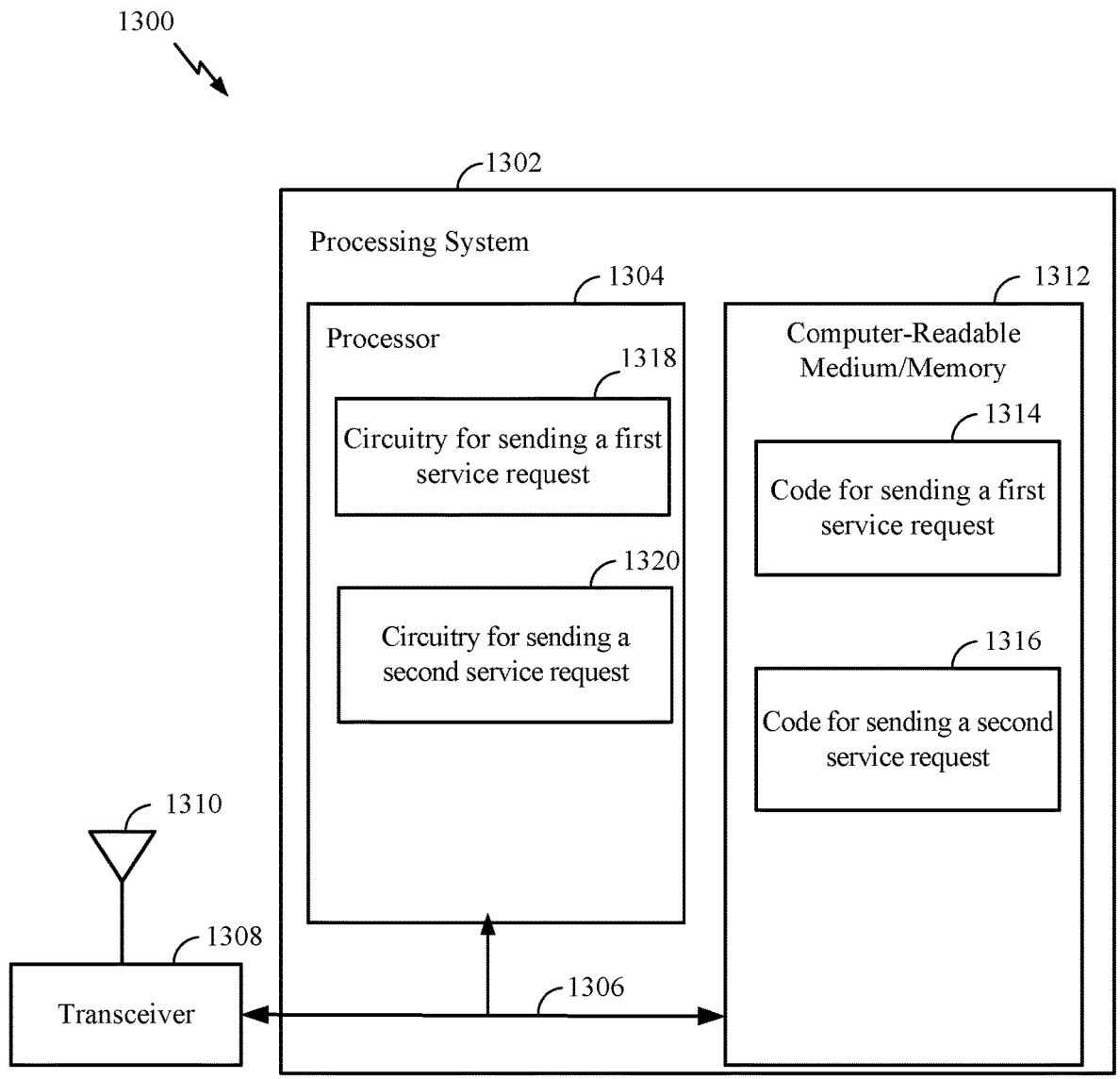
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein. In certain aspects, computer-readable medium/memory 1312 stores code 1314 for sending a first service request to establish a connection with a network; and code 1316 for sending a second service request to the network upon determining that one or more criteria is satisfied. In certain aspects, the processor 1304 has circuitry configured to implement the code stored in the computer-readable medium/memory 1312. The processor 1304 includes circuitry 1318 for sending a first service request to establish a connection with a network; and circuitry 1320 for sending a second service request to the network upon determining that one or more criteria is satisfied.

Figure 14:
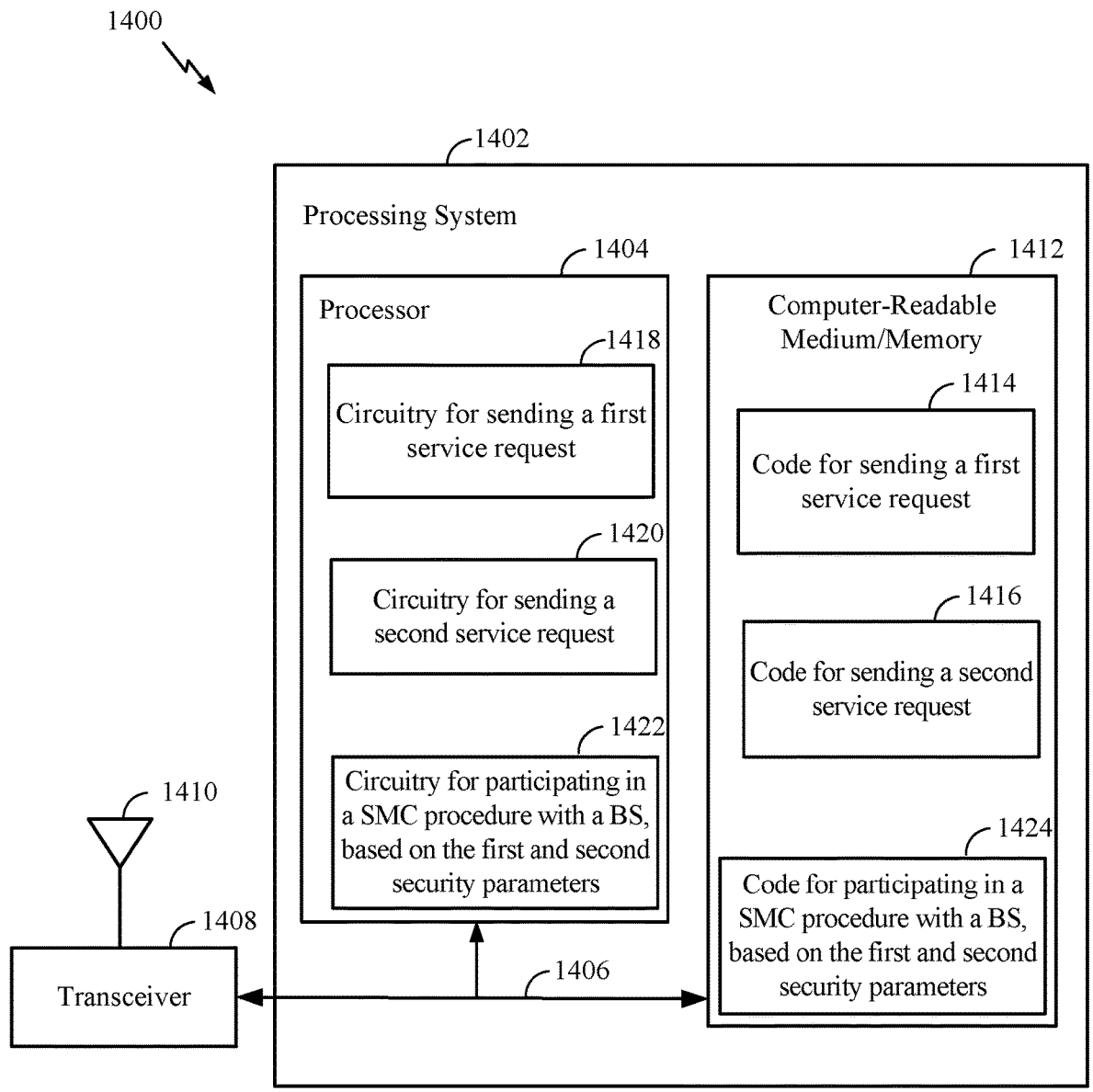
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 12. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 12, or other operations for performing the various techniques discussed herein. In certain aspects, computer-readable medium/memory 1412 stores code 1414 for sending a first service request to establish a connection with a network, wherein the first service request is associated with a first security parameter; code 1416 for sending a second service request to the network after sending the first service request, wherein the second service request is associated with a second security parameter; and code 1424 for participating in a SMC procedure with a base station, based on the first and second security parameters. In certain aspects, the processor 1404 has circuitry configured to implement the code stored in the computer-readable medium/memory 1412. The processor 1404 includes circuitry 1418 for sending a first service request to establish a connection with a network, wherein the first service request is associated with a first security parameter; circuitry 1420 for sending a second service request to the network after sending the first service request, wherein the second service request is associated with a second security parameter; and circuitry 1422 for participating in a SMC procedure with a base station, based on the first and second security parameters.

Example Clauses

Implementation examples are described in the following numbered clauses:

Clause 1: A method for wireless communications by a UE, comprising: sending a first service request to establish a connection with a network, wherein the first service request is associated with a first security parameter; and upon determining that one or more criteria is satisfied, sending a second service request to the network, wherein the second service request is associated with a second security parameter.

Clause 2: The method according to clause 1, further comprising generating the second service request after sending the first service request and prior to determining that the one or more criteria is satisfied.

Clause 3: The method according to any of clauses 1-2, further comprising, after generating the second service request, participating in a security mode command procedure with a base station.

Clause 4: The method according to clause 3, wherein the one or more criteria comprises completion of the security mode command procedure.

Clause 5: The method according to clause 3, wherein the one or more criteria comprises receiving an access stratum (AS) security mode command message as part of the security mode command procedure with the base station, wherein the AS security mode command message is associated with the first service request.

Clause 6: The method according to clause 3, wherein participating in the security mode command procedure comprises: receiving an access stratum (AS) security mode command message from the base station; and performing an integrity verification of the AS security mode command message, based at least in part on the first security parameter.

Clause 7: The method according to any of clauses 1-6, wherein the one or more criteria comprises receiving an indication that the first service request is accepted or receiving an indication that the first service request is rejected.

Clause 8: The method according to any of clauses 1-7, wherein the one or more criteria comprises receiving an indication that a data radio bearer has been established for the first service request.

Clause 9: The method according to any of clauses 1-8, further comprising buffering the second service request until determining that the one or more criteria is satisfied.

Clause 10: The method according to any of clauses 1-9, wherein the first service request is associated with a first service type and the second service request is associated with a second service type.

Clause 11: The method according to clause 10, wherein the first service type and the second service type are the same.

Clause 12: The method according to clause 10, wherein the first service type is different from the second service type.

Clause 13: The method according to clause 10, wherein each of the first service type and the second service type is selected from a plurality of service types comprising at least one of: signaling bearers, data bearers, mobile terminated services, emergency services, emergency services fallback, high priority access, or elevated signaling.

Clause 14: The method according to any of clauses 1-13, wherein the first security parameter comprises a first non-access stratum (NAS) count and the second security parameter comprises a different second NAS count.

Clause 15: An apparatus comprising a processing system, a receiver, and a transmitter, the apparatus being configured to perform the method according to any of clauses 1-14.

Clause 16: An apparatus comprising means for performing the method according to any of clauses 1-14.

Clause 17: A non-transitory computer-readable medium comprising computer-executable instructions that, when executed by one or more processors of a processing system, cause a UE to perform the method according to any of clauses 1-14.

Clause 18: A computer program product for wireless communication by a UE and embodied on a computer-readable storage medium, the computer-readable storage medium comprising code for performing the method according to any of clauses 1-14.

Clause 19: A method for wireless communications by a UE, comprising: sending a first service request to establish a connection with a network, wherein the first service request is associated with a first security parameter; after sending the first service request, sending a second service request to the network, wherein the second service request is associated with a second security parameter; and participating in a security mode command procedure with a base station, based on the first security parameter and the second security parameter.

Clause 20: The method according to clause 19, wherein participating in the security mode command procedure comprises: receiving an access stratum (AS) security mode command message from the base station; and performing a first integrity verification of the AS security mode command message, based at least in part on the first security parameter.

Clause 21: The method according to clause 20, wherein participating in the security mode command procedure further comprises upon determining that the first integrity verification of the AS security mode command message failed, performing a second integrity verification of the AS security mode command message, based at least in part on the second security parameter.

Clause 22: The method according to any of clauses 19-21, wherein the first service request is associated with a first service type and the second service request is associated with a second service type.

Clause 23: The method according to clause 22, wherein the first service type and the second service type are the same.

Clause 24: The method according to clause 22, wherein the first service type is different from the second service type.

Clause 25: The method according to clause 22, wherein each of the first service type and the second service type is selected from a plurality of service types comprising at least one of: signaling bearers, data bearers, mobile terminated services, emergency services, emergency services fallback, high priority access, or elevated signaling.

Clause 26: The method according to any of clauses 19-25, wherein the first security parameter comprises a first non-access stratum (NAS) count and the second security parameter comprises a different second NAS count.

Clause 27: An apparatus comprising a processing system, a receiver, and a transmitter, the apparatus being configured to perform the method according to any of clauses 19-26.

Clause 28: An apparatus comprising means for performing the method according to any of clauses 19-26.

Clause 29: A non-transitory computer-readable medium comprising computer-executable instructions that, when executed by one or more processors of a processing system, cause a UE to perform the method according to any of clauses 19-26.

Clause 30: A computer program product for wireless communication by a UE and embodied on a computer-readable storage medium, the computer-readable storage medium comprising code for performing the method according to any of clauses 19-26.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, which may be narrowband IoT (NB-IOT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11 and/or FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   sending a first service request to a network node to establish a connection with a network, wherein the first service request is associated with a first security parameter;
   determining whether a set of criteria are satisfied;
   in response to determining that the set of criteria are satisfied, sending a second service request to the network node, wherein the second service request is associated with a second security parameter, wherein the one or more criteria is based in part upon an indication received from the network node;
   wherein the one or more-set of criteria comprise:
   receiving an access stratum (AS) security mode command message as part of a security mode command procedure with the network node, wherein the AS security mode command message is associated with the first service request;
   completing an integrity verification of the AS security mode command message, based at least in part on the first security parameter.

2. The method of claim 1, further comprising generating the second service request after sending the first service request and prior to determining that the set of criteria are satisfied.

3. The method of claim 2, further comprising, after generating the second service request, participating in a security mode command procedure with the network node.

4. The method of claim 3, wherein the set of criteria further comprises completion of the security mode command procedure.

5. The method of claim 1, wherein the set of criteria further comprises receiving an indication that the first service request is accepted or receiving an indication that the first service request is rejected.

6. The method of claim 1, wherein the set of criteria further comprises receiving an indication that a data radio bearer has been established for the first service request.

7. The method of claim 1, further comprising buffering the second service request until determining that the set of criteria is satisfied.

8. The method of claim 1, wherein the first service request is associated with a first service type and the second service request is associated with a second service type.

9. The method of claim 8, wherein the first service type and the second service type are the same.

10. The method of claim 8, wherein the first service type is different from the second service type.

11. The method of claim 8, wherein each of the first service type and the second service type is selected from a plurality of service types comprising at least one of: signaling bearers, data bearers, mobile terminated services, emergency services, emergency services fallback, high priority access, or elevated signaling.

12. The method of claim 1, wherein the first security parameter comprises a first non-access stratum (NAS) count and the second security parameter comprises a different second NAS count.

13. An apparatus for wireless communications, comprising:
   a transmitter configured to transmit a first service request to a network node to establish a connection with a network, wherein the first service request is associated with a first security parameter; and
   a processing system comprising:
      a memory comprising computer-executable instructions; and
      one or more processors configured to execute the computer-executable instructions and cause the processing system to:
      determine whether a set of criteria is satisfied, wherein the one or more criteria comprises:
         determining that an access stratum (AS) security mode command message associated with the first service request has been received from the network node as part of a security mode command procedure; and
         performing an integrity verification of the AS security mode command message, based at least in part on the first security parameter; and
      wherein the transmitter is further configured to transmit a second service request to the network node when the processing system determines the set of criteria is satisfied, wherein the one or more criteria is based in part upon an indication received from the network node; and
      the second service request is associated with a second security parameter.

14. The apparatus of claim 13, wherein the one or more processors are further configured to cause the processing system to generate the second service request after transmission of the first service request and prior to determining that the set of criteria is satisfied.

15. The apparatus of claim 14, wherein the one or more processors are further configured to cause the processing system to participate in a security mode command procedure with the network node, after generating the second service request.

16. The apparatus of claim 15, wherein the set of criteria further comprises completion of the security mode command procedure.

17. The apparatus of claim 15, further comprising a receiver configured to receive the access stratum (AS) security mode command message from the network node.

18. A method for wireless communications by a user equipment (UE), comprising:
   sending a first service request to a network node to establish a connection with a network, wherein the first service request is associated with a first security parameter;
   after sending the first service request, sending a second service request to the network node, wherein the second service request is associated with a second security parameter; and
   participating in a security mode command procedure with the network node, based on the first security parameter and the second security parameter, further comprising:
      receiving an access stratum (AS) security mode command message from the network node; and
      performing a first integrity verification of the AS security mode command message, based at least in part on the first security parameter;

upon determining that the first integrity verification of the AS security mode command message failed, performing a second integrity verification of the AS security mode command message, based at least in part on the second security parameter.

19. The method of claim 18, wherein the first service request is associated with a first service type and the second service request is associated with a second service type.

20. The method of claim 19, wherein the first service type and the second service type are the same.

21. The method of claim 19, wherein the first service type is different from the second service type.

22. The method of claim 19, wherein each of the first service type and the second service type is selected from a plurality of service types comprising at least one of: signaling bearers, data bearers, mobile terminated services, emergency services, emergency services fallback, high priority access, or elevated signaling.

23. The method of claim 18, wherein the first security parameter comprises a first non-access stratum (NAS) count and the second security parameter comprises a different second NAS count.

24. An apparatus for wireless communication, comprising:
one or more memories;
one or more processors coupled to the one or more memories, the one or more processors configured to:
    transmit a first service request to a network node to establish a connection with a network, wherein the first service request is associated with a first security parameter; and
    subsequent to the transmission of the first service request, transmit a second service request to the network node, wherein the second service request is associated with a second security parameter;
    receive an access stratum (AS) security mode command message from the network node; and
    perform a first integrity verification of the AS security mode command message, based at least in part on the first security parameter; and
    upon the determination that the first integrity verification of the AS security mode command message failed, perform a second integrity verification of the AS security mode command message, based at least in part on the second security parameter.

* * * * *